United States Patent

Noack

[11] 4,083,701
[45] Apr. 11, 1978

[54] PROCESS AND APPARATUS FOR REMOVING UNDESIRABLE GASES FROM FLUE GASES

[75] Inventor: Rolf Noack, Oberhausen, Germany

[73] Assignee: Deutsche Babcock Aktiengesellschaft, Oberhausen, Germany

[21] Appl. No.: 695,768

[22] Filed: Jun. 14, 1976

[30] Foreign Application Priority Data

Oct. 9, 1975 Germany .............................. 2545218

[51] Int. Cl.² ............................................ B01D 53/02
[52] U.S. Cl. .......................................... 55/20; 55/73; 55/79; 55/99; 55/269; 55/338; 55/387; 55/390; 55/479; 55/210
[58] Field of Search .................... 55/20, 73, 79, 60, 62, 55/99, 350, 474, 479, 390, 339, 340, 338, 269, 387, 210, 217, 240

[56] References Cited

U.S. PATENT DOCUMENTS

| | | | |
|---|---|---|---|
| 1,528,459 | 3/1925 | Voress | 55/62 |
| 1,549,680 | 8/1925 | Nordstrom | 55/474 |
| 2,345,774 | 4/1944 | Simpson | 55/62 |
| 2,601,102 | 6/1952 | Dickey | 55/474 |
| 3,883,326 | 5/1975 | Wenner | 55/73 |
| 3,890,120 | 6/1975 | Guyot et al. | 55/62 |
| 3,960,529 | 6/1976 | Jentsen et al. | 55/390 |

FOREIGN PATENT DOCUMENTS

216,675  6/1924  United Kingdom .................. 55/474

*Primary Examiner*—Bernard Nozick
*Attorney, Agent, or Firm*—Max Fogiel

[57] ABSTRACT

A method for removing by adsorption undesirable components such as sulphur dioxide, from waste gases, particularly flue gas. Activated carbon is located between two perforated walls. The flue gas to be cleaned, traverses the activated carbon. During shutdown or low-load operation of the plant, the flue gas is already cleaned in the adsorber or still remaining in the associated apparatus section, are fed back and are passed once more through the activated carbon. The fed-back flue gases may be cooled before being passed once more through the activated carbon. An inert gas at a pressure substantially above atmospheric may be injected in the adsorber installation. The temperature and/or the oxygen content of the fed-back flue gas is monitored. The activated carbon fill is divided by heat-insulated partitions into individual sections which are charged separately with fed-back flue gas.

17 Claims, 2 Drawing Figures

PROCESS AND APPARATUS FOR REMOVING UNDESIRABLE GASES FROM FLUE GASES

BACKGROUND OF THE INVENTION

The present invention relates to a process and associated apparatus for removing undesirable components such as sulphur dioxide from waste gases, particularly from flue gas, by adsorption on activated carbon which is located as fill between two perforated walls through which the flue gases are made to pass.

In this process, the sulphur dioxide or other components such as nitrogen oxides, hydrocarbons or fluorene from the flue gas is adsorbed in the pores of the activated carbon. The charged activated carbon is removed from the adsorber by means of conveyors and regenerated by heating, washing with water or similar procedures and returned to the adsorber. Instead of the activated coal, one may also use a specially treated anoxidized and activated coke. When the term activated carbon is used hereinbelow, it refers both to activated coal and activated coke.

A disadvantage of this adsorption process is that the activated carbon used under unfavorable operating conditions, tends towards spontaneous combustion which might lead to the destruction of the desulphurization installation. The greater the propensity of the activated carbon to react with respect to sulphur dioxide adsorption, the greater is the hazard of spontaneous combustion. Therefore, for the safe operation of such installations means must be found to prevent the spontaneous combustion of the activated carbon. It has been found that spontaneous combustion of the activated carbon takes place only when there is no gas flow or only slight gas flow through the fill. In these cases, the heat of reaction arising from quiet oxidation cannot be carried off.

It is, therefore, an object of the present invention to provide a process where the spontaneous combustion of the activated carbon during shutdown or low-load operation of the adsorber is prevented.

Another object of the present invention is to provide an arrangement which is simple in design and construction, and may be easily maintained in service.

A further object of the present invention is to provide an arrangement which may be economically operated and which has a substantially long service life.

SUMMARY OF THE INVENTION

The objects of the present invention are achieved by providing that during shutdown or low-load operation, the flue gases which have already been cleaned and are still present in the adsorber or in associated components are fed back and are passed once more through the activated carbon fill.

The feedback of the cleaned flue gases and their recirculation through the activated carbon fill increases the gas permeation so that the fill is fully immersed. In this case, the flue gases cool the activated carbon bed. This prevents overheating of the activated carbon and lowers the temperature of the activated carbon considerably below the spontaneous combustion temperature of the activated carbon, so that the hazard of spontaneous combustion is avoided. Even already existing smoldering fires can be put out by lowering the temperature of the activated carbon.

As an improvement of the process, in accordance with the present invention, it is proposed that the fed-back flue gases are cooled before being blown through the activated carbon. It is also provided that the temperature and/or the oxygen content of the fed-back flue gases or the temperature in the activated carbon fill be monitored; when these values are changed, thus suggesting incipient or existing spontaneous combustion of the activated carbon, suitable countermeasures can be initiated. Another measure against the propagation of smoldering fires is the division of the activated carbon fill by heat-insulated partitions into separate sections which are separately supplied with fed-back flue gas. In this case, local overheating can be cooled or smoldering fires can be put out easily by increased flue gas recirculation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
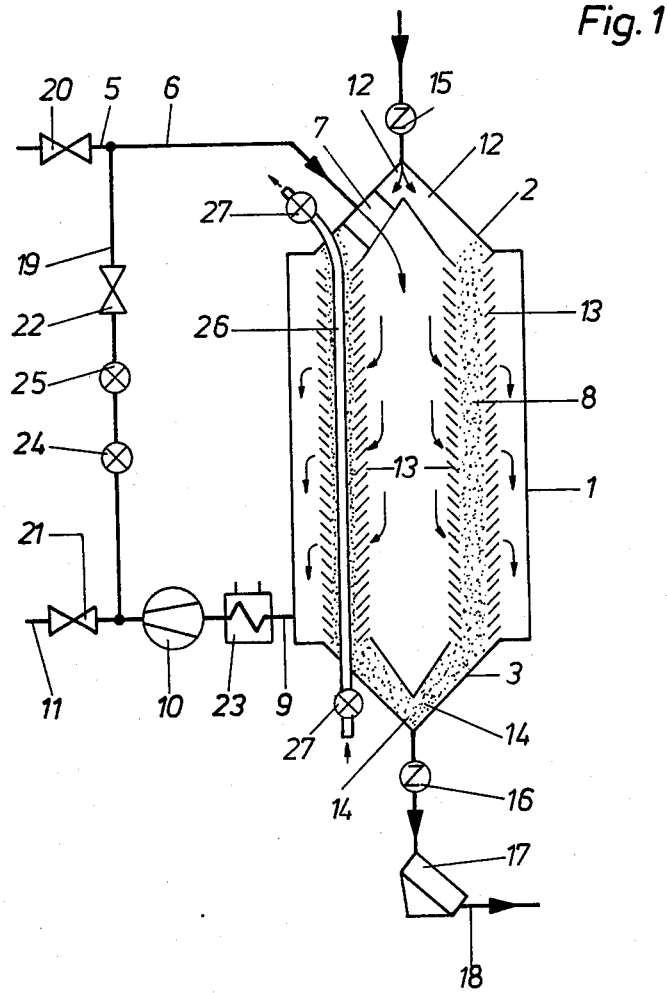
FIG. 1 shows a schematic lengthwise section through an adsorber of the apparatus, in accordance with the invention.
Figure 2:
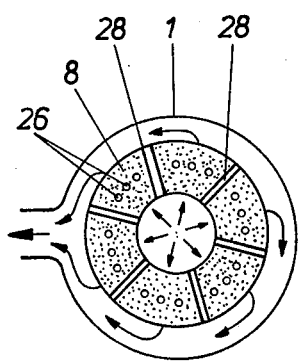
FIG. 2 is a cross-sectional view of the apparatus of FIG. 1.

The adsorber shown is used for the removal of sulphur dioxide from the smoke gases of a boiler installation. It comprises a housing with a cylindrical outside jacket 1, a roof 2 and a bottom section 3. The flue gas to be desulphurized, after having passed the dust separator, is introduced at a temperature between 110° and 140° C via the gas line 5 and the intake line 6 through an opening 7 in roof 2 of the adsorber. It flows radially from the inside outward through an annular heap 8 of activated carbon, is collected on the outside jacket 1 and after desulphurization, leaves the adsorber through the exit line 9 in the vicinity of the bottom section 3. An induced draft blower 10 located in the exit line 9 transports the desulphurized flue gas through the waste gas line 11 to a chimney (not shown).

The activated carbon with a granulation of 8 mm is supplied through a pipe system 12 located in roof 2 of the adsorber. The fill builds up between two concentric perforated walls 13. The perforated walls 13 consist of sheet metal strips arranged in the manner of venetian blinds (louvers) through which the flue gas flows. The activated charcoal is continuously withdrawn by inclined chutes 14 in the bottom 3 of the adsorber. Hence the fill travels downward as a unit. The supply and withdrawal of the activated carbon proceeds in a gas-tight manner through the cell wheel gates 15 and 16. The loaded activated carbon, after the dust has been removed on the filter 17, is transported by a conveyor 18 to a regeneration installation (not shown). The activated carbon which has been regenerated there and has been cooled by a thermal regeneration to approximately 130°, is again filled into the adsorber via the pipe system 12. The activated carbon is circulated between adsorption installation and regeneration installation to facilitate continuous operation.

Under unfavorable conditions, the local temperature inside the activated carbon fill 8 may rise to such a degree that it self-ignites. In order to counter the hazard of spontaneous combustion, the following steps are taken.

The intake line 6 is connected to the exit line 9 by a connecting line 19 to constitute a gas circulation system comprising the intake line 6, the exit line 9 and the connecting line 19. Each of the lines has a valve 20, 21 or 22, respectively. Upon closing valves 20 and 21 and opening valve 22, the flue gas present in the adsorber and in the connected pipe lines is circulated. The induced draft blower 10, located in exit line 9, serves as circulating blower. It is also possible to partially open valves 20 and 21 when valve 22 is open. In this case, only part of the exiting desulphurized flue gas is circulated (revolved), by being mixed, via connection line 19, with the flue gas entering via gas line 5 and intake line 6. It is also possible to inject an inert gas into the gas circulating system.

Within the gas circulating system, e.g. in the exit line 9, there is a heat exchanger 23, through which a coolant, e.g., water, flows. In this heat exchanger, the fed-back flue gas can be cooled. Instead of using a gas cooler, the temperature of the fed-back flue gas can also be lowered by direct injection of water.

The connecting line 19 holds a thermocouple 24 for measuring the temperature of the fed-back flue gas and a measuring instrument for determining the oxygen content in gas. Monitoring the temperature and the oxygen content gives clues about the behavior of the activated carbon in the fill 8. An increase in temperature and a decrease of the oxygen content suggest that a smoldering fire develops or spreads. A decrease in temperature or an increase in oxygen content suggest fading away of the hazard of spontaneous combustion. In both cases, suitable steps must be taken in order to suppress, by increasing or reducing the fed-back flue gas quantity, the spontaneous combustion of the activated carbon.

Another possibility of monitoring is the measuring of the temperature in the activated carbon fill. Since the activated carbon 8 may have a volume of several thousand cubic meters, it is difficult to utilize individual temperature measuring locations. It is better to place pipes 26 in the activated carbon fill; measuring gas travels inside these pipes in a direction opposite to that of the direction of motion of the activated carbon. Thermocouples 27 are located in the gas path of these pipes 26. If the activated carbon fill is heated up at any point of a pipe, the temperature of the measuring gas in the pipe rises. This indication can be used to initiate a control device through which the gas flow of the fed-back flue gases is turned on or intensified.

In order to avoid inrush of air due to leaky shutoff devices or other leaky design elements, in case of a shutdown of the adsorber, a certain amount of flue gas or inert gas is fed into the adsorber. This produces a slight overpressure in relation to the atmosphere.

The active carbon fill 8 is divided into sections or cells by vertical radial heat-insulated partitions. In this manner possible smoldering fires can be restricted locally. The individual sections can be charged separately with fed-back flue gas. Thus, smoldering fires can be purposefully cooled or extinguished by an intensified flue gas supply, an inert gas may be added to the flue gas.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A method for removal by adsorption of undesirable components such as sulphur dioxide from waste gases, particularly flue gas, comprising the steps of: placing activated carbon between two perforated walls; traversing said activated carbon by flue gases to be cleaned; and feeding back only during shutdown and low-load operation the gas already cleaned and remaining to be cleaned for passing once more through said activated carbon; said step of feeding back occurring only during flow of gas through said activated carbon is substantially reduced during shutdown and low-load operation, cooling the fed back flue gases before being once more passed through said activated carbon, the feedback of said gas being independent of the composition of said flue gases, the feedback of said gases cooling the activated carbon to a temperature substantially below the spontaneous combustion temperature of the activated carbon for inhibiting spontaneous ignition of said carbon.

2. The method as defined in claim 1 including the step of injecting an inert gas at a pressure exceeding substantially atmospheric pressure.

3. The method as defined in claim 1 wherein said flue gas comprises inert gas.

4. The method as defined in claim 1 including the step of monitoring the temperature and oxygen content of the fed-back flue gas.

5. The method as defined in claim 1 including the step of dividing said activated carbon into individual sections by heat-insulated partitions, said individual sections of activated carbon being charged separately with fed-back flue gas.

6. The method as defined in claim 1 including the step of measuring the temperature of said activated carbon, the feeding back of said flue gas being controlled dependent on said temperature.

7. The method as defined in claim 1 including the step of adding an inert gas to said flue gas.

8. An arrangement for the removal by adsorption of undesirable components such as sulphur dioxide from waste gases, particularly flue gas, comprising: an adsorber; two perforated walls; activated carbon between said walls and traversed by gases to be cleaned; inlet means for admitting gases to be cleaned into said adsorber; outlet means for discharging gases from said adsorber after traversing said activated carbon; connecting line means connecting said outlet means with said inlet means for forming gas circulating means; cooling means in said circulating means, circulating blower means in said circulating means said connecting line means comprising means operative only during flow of gas through said activated carbon is substantially reduced during shutdown and low-load operation, the feedback of said gas being independent of the composition of said flue gases, the feedback of said gases cooling the activated carbon to a temperature substantially below the spontaneous combustion temperature of the activated carbon for inhibiting spontaneous ignition of said carbon.

9. The arrangement as defined in claim 8 wherein the interior of said adsorber is maintained at a pressure exceeding substantially atmospheric by said flue gas.

10. The arrangement as defined in claim 8 including measuring means in said gas circulating means for measuring the oxygen content in the flue gas passed through said connecting line means.

11. The arrangement as defined in claim 8 including temperature measuring means in said gas circulating means for measuring the temperature of the flue gas passed through said connecting line means, said connecting line means comprising feedback means.

12. The arrangement as defined in claim 8 including partitions between said perforated walls for dividing the space between said perforated walls into individual sections.

13. The arrangement as defined in claim 12 wherein each of said sections is separately connected to said gas circulating means.

14. The arrangement as defined in claim 12 wherein said partitions are heat-insulated.

15. The arrangement as defined in claim 8 including pipe means in said activated carbon for conducting gas to be measured; and thermocouple means in said pipe means for measuring the temperature of gases through said pipe means.

16. The arrangement as defined in claim 15 including control means connected to said thermocouple means for operating said circulating blower means upon the gases in contact with said thermalcouple means attaining a predetermined temperature.

17. The arrangement as defined in claim 8 wherein said circulating blower means is in said outlet means and comprises an induced draft blower.

* * * * *